United States Patent
Fletcher

(10) Patent No.: US 10,890,119 B2
(45) Date of Patent: Jan. 12, 2021

(54) LOCALE SPECIFIC VEHICLE REGULATION COMPLIANCE

(71) Applicant: INTERNATIONAL BUSINESS MACHINES CORPORATION, Armonk, NY (US)

(72) Inventor: James Corvin Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/197,896

(22) Filed: Nov. 21, 2018

(65) Prior Publication Data

US 2020/0158029 A1 May 21, 2020

(51) Int. Cl.
| | |
|---|---|
| *F02D 17/04* | (2006.01) |
| *G01C 21/20* | (2006.01) |
| *H04W 4/40* | (2018.01) |
| *H04W 4/021* | (2018.01) |

(52) U.S. Cl.
CPC .............. *F02D 17/04* (2013.01); *G01C 21/20* (2013.01); *H04W 4/021* (2013.01); *H04W 4/40* (2018.02); *F02D 2200/10* (2013.01); *F02D 2200/701* (2013.01)

(58) Field of Classification Search
CPC .............. F02D 17/04; F02D 2200/10; F02D 2200/701; H04W 4/40; H04W 4/021; G01C 21/20
See application file for complete search history.

(56) References Cited

U.S. PATENT DOCUMENTS

| | | | |
|---|---|---|---|
| 7,912,630 B2 | 3/2011 | Alewine et al. | |
| 9,296,402 B2 * | 3/2016 | Backes | B61L 23/10 |
| 9,330,567 B2 * | 5/2016 | Ricci | B60K 37/06 |
| 9,704,084 B2 * | 7/2017 | Nordlund | G06Q 10/08 |
| 2012/0109451 A1 | 5/2012 | Tan | |
| 2014/0074319 A1 | 3/2014 | McHugh et al. | |
| 2014/0195074 A1 * | 7/2014 | Hunt | B60W 50/08 |
| | | | 701/2 |
| 2017/0067385 A1 | 3/2017 | Hunt | |
| 2017/0217360 A1 | 8/2017 | Pierfelice | |

OTHER PUBLICATIONS

"Method to control vehicle operation by geographic location" An IP.com Prior Art Database Technical Disclosure, Authors et. al.: IBM, Original Publication Date: Jun. 23, 2008, IP.com No. IPCOM000171968D, IP.com Electronic Publication Date: Jun. 23, 2008.

* cited by examiner

*Primary Examiner* — Hieu T Vo
(74) *Attorney, Agent, or Firm* — Patterson + Sheridan, LLP

(57) ABSTRACT

Method and apparatus for determining instructions for a vehicle are provided. One example method generally includes monitoring location information of a vehicle and detecting a change in a location of the vehicle based on the monitoring, wherein the location change is between a first regulatory area and a second regulatory area. The method further includes generating instructions for the vehicle based on the location change, wherein the instructions place the vehicle in compliance with a regulation of the second regulatory area and transmitting the instructions to the vehicle.

18 Claims, 5 Drawing Sheets

LOCALE SPECIFIC VEHICLE REGULATION COMPLIANCE

BACKGROUND

The present invention relates to ensuring compliance with regulations, and more specifically, to ensuring vehicle compliance with local regulations.

It is common for regulatory bodies, such as local governments, to create various vehicle regulations for specific areas, for environmental or safety reasons. For example, a regulatory body in charge of an airport may create a regulation prohibiting certain commercial vehicles from idling for more than a set amount of time. However, effective implementation of such regulation may be dependent on the compliance of human operators. Human operators may be prone to errors in failing to comply, or in simple ignorance of the regulation. Computerized automation of regulation compliance has been ineffective due to the specificity of certain regulations. For example, prohibiting vehicle idling over five minutes may comply with the regulation where that regulation is in place, but may be inappropriate to apply generally when such idling is allowed in non-regulated areas. Thus, systems and methods are needed which can automate compliance with vehicle regulations taking into account the physical limits of such vehicle regulations.

SUMMARY

Certain embodiments provide a method for determining instructions for a vehicle. The method generally includes monitoring location information of a vehicle and detecting a change in a location of the vehicle based on the monitoring, wherein the location change is between a first regulation area and a second regulation area. The method further includes generating automated operational instructions for the vehicle based on the location change, wherein the instructions place the vehicle in compliance with a regulation of the second regulation area and transmitting the instructions to the vehicle.

Another embodiment includes a computing device comprising a processor and memory including instructions that cause the computing device to perform the method for determining instructions for a vehicle described above.

Still another embodiment provides a method for implementing instructions on a vehicle. The method generally includes determining, by a vehicle using cached geo-fence data, the vehicle has entered into a second regulation area from a first regulation area and requesting, from an event server, instructions for the second regulation area wherein the instructions place the vehicle in compliance with a regulation of the second regulation area. The method further includes receiving the instructions from the event server, determining whether the instructions conflict with safety requirements of the vehicle and upon determining the instructions do not conflict with safety requirements of the vehicle, implementing the instructions.

DETAILED DESCRIPTION

By using vehicle location data and network-accessible geo-fence data which identifies the boundaries for the regulation applicability, a vehicle can automatically implement instructions that put the vehicle in compliance with local environmental or safety regulations. The geo-fence data may be stored on a remotely accessible server that correlates the geo-fence data with regulations specific to areas defined by the geo-fence data. The geo-fences may define small areas, (such as airports or school zones) or large areas (such as state boundaries). For example, one geo-fence may define the bounds of an airport, and various vehicle regulations that are in effect within the bounds of the airport.

For example, an event server may receive location information from a vehicle indicating that the vehicle is within the airport. The event server may determine based on this location information, a set of instructions for complying with a particular regulation (e.g., preventing vehicle idling for more than five minutes) for the vehicle to implement in order to be in compliance with the regulations of the airport. The event server may take into account various other factors that affect the applicability of the regulations, such as the type of vehicle (e.g., a personal car or a commercial vehicle), the time of day, or prevailing weather conditions.

By use of the methods described herein, vehicles can remain in compliance with various local vehicle regulations even if the operator of the vehicle is not aware of the regulations. So doing may improve the rate of regulations compliance of vehicles generally, and may also reduce the liability for fines of operators of vehicle fleets, by assuring regulation compliance with no regard to operator training or preparedness. In some cases, proper compliance with regulations may also improve the efficiency (e.g., fuel consumption) of vehicles, and so automated compliance may be beneficial to the operation of the vehicle itself.

Figure 1:
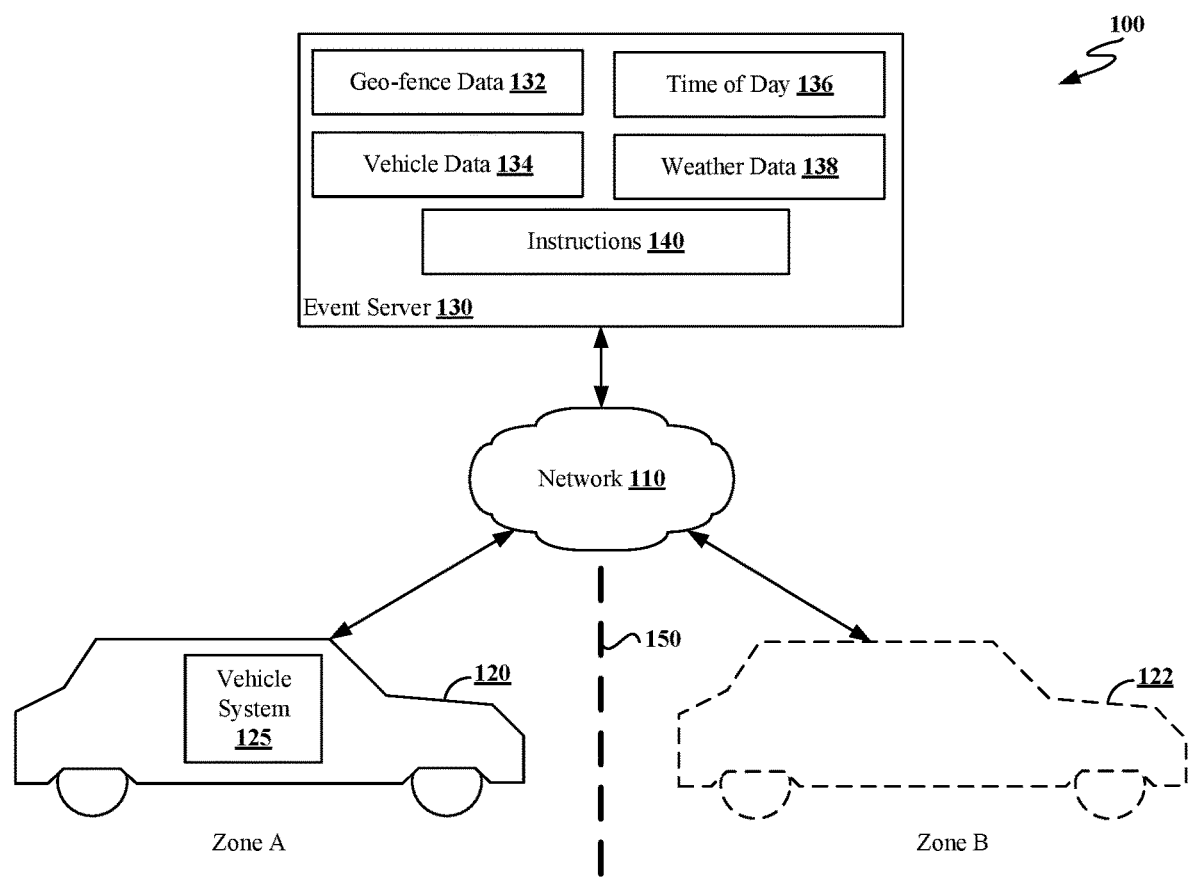
FIG. 1 is a conceptual diagram of a vehicle crossing a geo-fence.

FIG. 1 is a conceptual diagram 100 of vehicle 120 crossing geo-fence 150. Conceptual diagram 100 includes vehicle 120 and event server 130, connected via network 110. As depicted, vehicle 120 may cross geo-fence 150 to go from Zone A to Zone B.

Vehicle 120 is a motor vehicle including vehicle system 125. When crossing into Zone B, vehicle 120 is represented at 122. Although shown as a personal car, the methods described herein are applicable to a wide variety of vehicles such as passenger busses, tractor trailers or other commercial vehicles, so long as the vehicle includes an appropriate vehicle computing system. Vehicle system 125 is a computing system connecting various components of vehicle 122. For example, vehicle system 125 may include components controlling an engine of vehicle 122. In this example, vehicle system 125 includes a networked server interface for communication with event server 130 over network 110. The components of vehicle system 125 are described in further detail below with respect to FIG. 2.

Event server 130 is a computing device including a processor and memory (not shown) accessible over network 110. As shown, event server 130 includes geo-fence data 132, vehicle data 134, time of day 136, weather data 138 and instructions 140. Geo-fence data 132 is a set of coordinate information defining regulatory areas, along with a set of regulations applying to each area. While some regulations apply at all times, other regulations may have conditions for applicability. For example, some regulations only apply at certain times of day or during certain days of the week, and other regulations apply during certain weather conditions. Other conditions may include the type of vehicle.

Vehicle data 134, time of day 136 and weather data 138 are information collected by event server 130 in order to determine the applicability of regulations. Vehicle data 134 is a set of information related to vehicle 120, including the of vehicle type (e.g., personal or commercial), as well as performance information (e.g., fuel consumption) of vehicle 120. Vehicle data 134 may be collected from by event server 130 via vehicle system 125.

Using, geo-fence data 132, vehicle data 134, time of day 136 and weather data 138 event server 130 generates instructions 140. Instructions 140 are a set of instructions (or prohibitions) for vehicle 120 to comply with a particular regulation. For example, one instruction may be prohibiting idling of more than a certain amount of time. Other instructions may include fuel mixtures for use or prohibition on various activities such as engine braking, or various other instructions relating to compliance with environmental or safety regulations.

In some examples, vehicle 120 regularly transmits location information to event server 130. In this example, vehicle 120 crosses geo-fence 150 and moves to the location shown at 122. Geo-fence 150 demarcates the boundary between zone A and zone B. Zone B has different applicable regulations compared to zone A. As a result, when vehicle 120 enters zone B, a process for determining applicable regulations for zone B begins. The first location transmission from vehicle 120 to event server 130 once vehicle 120 has entered zone B indicates to event server 130 that vehicle 120 may be subject to regulations that vehicle 120 was not subject to in zone A. Thus, event server 130 uses geo-fence data 132 to determine the current regulatory area of vehicle 120, and the applicable regulations of that regulatory area. Then, using vehicle data 134, time of day 136 and weather data 138, event server 130 determines what regulations apply to vehicle 120 within zone B at the current time. Event server 130 then generates instructions 140, and transmits instructions 140 to vehicle 120.

Once received, vehicle 120 may implement instructions 140, or may ignore instructions 140 if they conflict with safe operation of vehicle 120. For example, an instruction prohibiting engine braking may be ignored by vehicle 120 if vehicle 120 is performing an emergency exit and all methods of braking are in use.

In other examples, vehicle 120 may maintain a local cache of geo-fence data 132, and report to event sever 130 when vehicle 120 crosses geo-fence 150. In such examples, vehicle 120 may receive instructions 140 in response to the location report. In still other cases, vehicle 120 may maintain a local cache of both geo-fence data 132 and instructions 140. In such cases, vehicle 120 may transmit a confirmation request to event server 130 that the cached instructions are currently valid.

Figure 2:
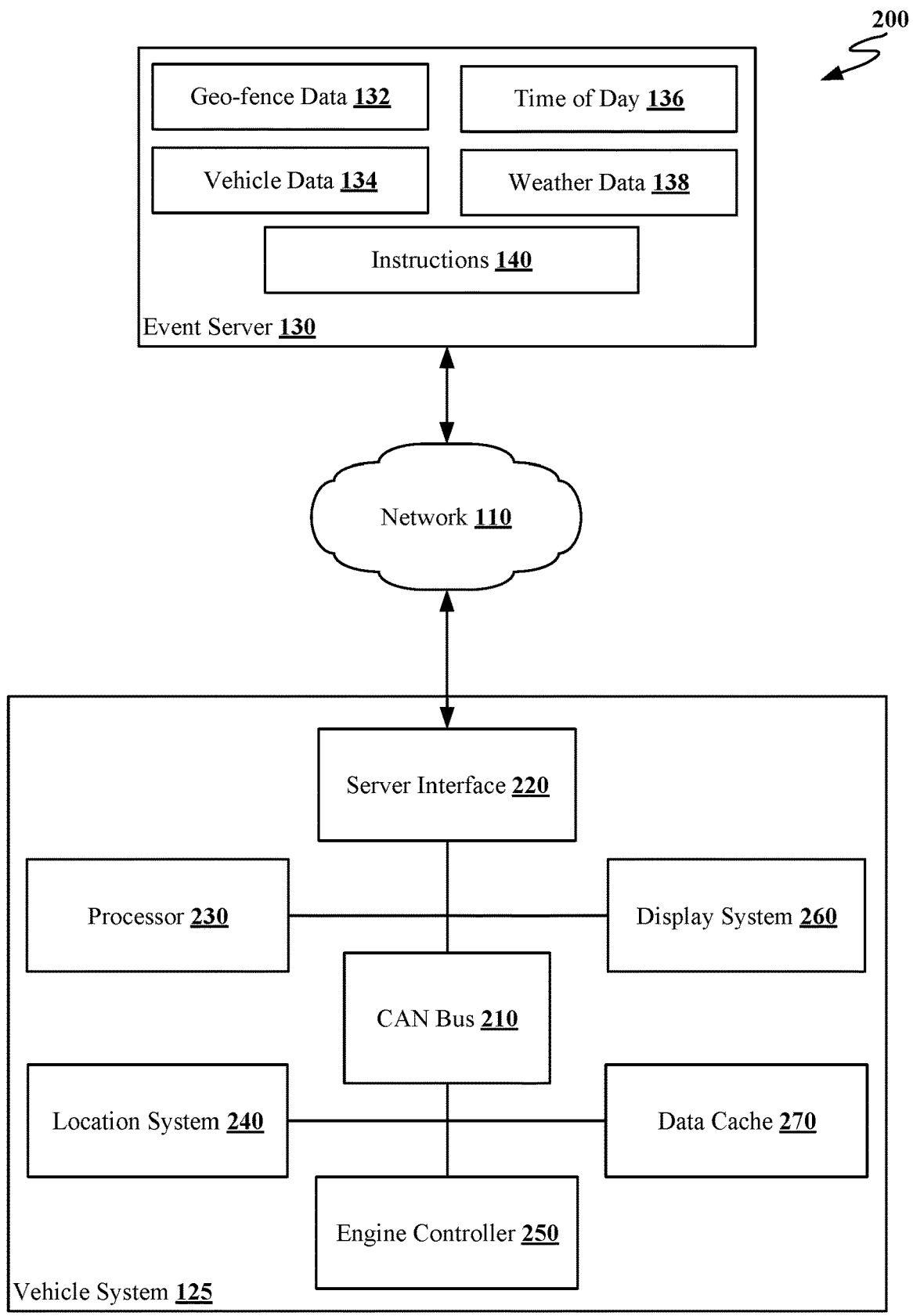
FIG. 2 depicts an example computing environment for automatic compliance with vehicle regulations.

FIG. 2 depicts an example computing environment 200 for automatic compliance with vehicle regulations. Computing environment 200 includes vehicle system 125 and event server 130 connected via network 110. Vehicle system 125 is (as depicted in FIG. 1) a computing system of a vehicle. Vehicle system includes a plurality of components connected via Controller Area Network (CAN) bus 210. CAN bus 210 is a data bus connecting the various electric components of a vehicle. CAN bus 210 connects server interface 220, processor 230, location system 240, engine controller 250, display system 260 and data cache 270. In practice, a CAN bus may connect various other vehicle components, such as a vehicle battery or diagnostic devices.

Server interface 220 is a network enabled device that communicates with event server 130 via network 110. The network connection utilized by server interface 220 may be provided by a variety of sources. For example, vehicle system 125 may include a networking device (not shown) such as a radio antenna or satellite receiver. In other examples, the network connection utilized by server interface 220 may be provided by a tethered mobile device connected to vehicle system 125. In any case, the network connection is used by server interface 220 to send transmissions to and receive transmissions from event server 130.

Processor 230 is intended to be representative of a single or multi-core central processing unit (CPU). Processor 230 processes transmissions to and from event server 130, as well as make determinations for vehicle system 125 such as implementing or ignoring instructions 140 depending on whether instructions 140 conflict with safe operation of the vehicle.

Location system 240 is a computing device that tracks the location of the vehicle, such as by using a Global Positioning Satellite (GPS) system. Location system 240 tracks the location of the vehicle in latitude and longitude, which can be used in various transmissions to and from event server 130. In some examples, the location data produced by location system 240 is regularly transmitted to event server 130, while in other examples the location data may be compared by vehicle system 125 to cached geo-fence data to determine when the vehicle has entered a new regulatory area.

Engine controller 250 is a device that controls various aspects of the vehicle's engine, such as the fuel mixture provided to the fuel injectors of the engine, or the ability of the engine to perform engine braking. In this example a general engine controller is shown to control all aspects of the engine system generally but in other examples, a separate transmission controller or fuel injection controller may be provided for those components of the engine system, in addition to other discrete devices for other engine components. In general, vehicle system 125 instructs engine controller 250 to implement instructions 140 if instructions 140 do not conflict with safe operation of the vehicle.

Display system 260 is a computing system controlling the various warning lights and/or display screens of the vehicle. In some cases, instructions 140 may include instructions to display various information to the operator of the vehicle. For example, if the vehicle is in a regulatory area prohibiting engine braking, vehicle system 125 may instruct display system 260 to display a notice of this prohibition to the operator of the vehicle.

Data cache 270 is a local storage device of vehicle system 125. Data cache 270 can be used to cache a local copy of geo-fence data 132, allowing vehicle system 125 to determine when the vehicle has crossed a geo-fence without transmissions to and from event server 130. Data cache 270 can also be used to cache a local copy of instructions 140, allowing vehicle system 125 to temporarily implement instructions without transmissions from event server 130, which may be useful if a network connection is temporarily unavailable. However, even in such cases vehicle system 125 sends a confirmation request to event server 130 to confirm that the cached instructions are currently correct.

In general, location system 240 regularly tracks location information of the vehicle, and vehicle system 125 regularly transmits the location information to event server 130 via server interface 220. Event server 130 then, as described above with respect to FIG. 1, generates instructions 140, and transmits instructions to vehicle system 125. Vehicle system 125 then determines if instructions 140 conflict with safe operation of the vehicle, and if instructions 140 do not conflict with safe operation, vehicle system 125 implements instructions 140. Implementation of instructions 140 may include instructions to components of vehicle system 125, such as engine related instructions to engine controller 250 or display instructions to display system 260.

Figure 3:
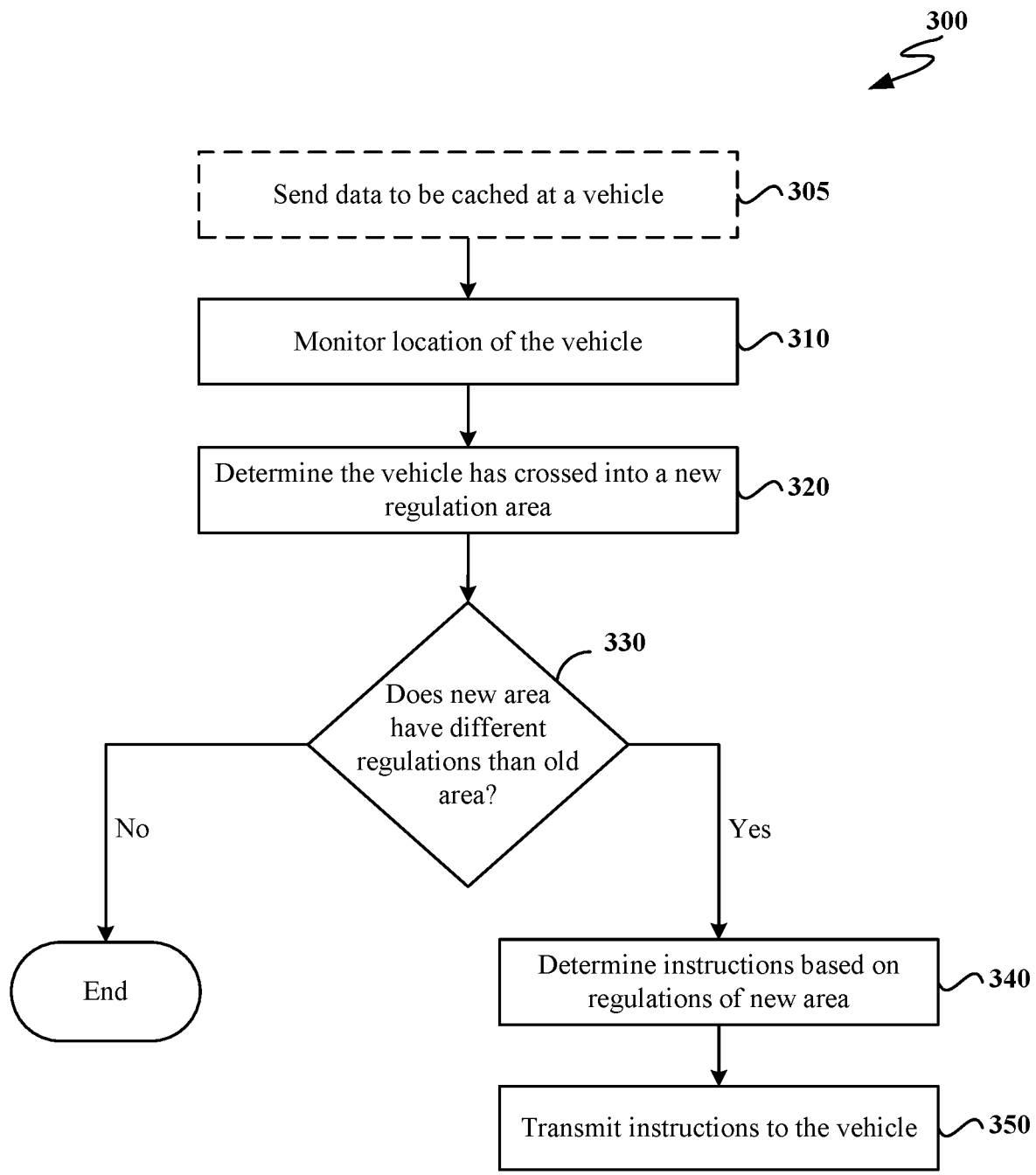
FIG. 3 is a flow diagram showing an example method for generating instructions for compliance with a regulation area.

FIG. 3 is a flow diagram showing an example method 300 for generating instructions. Method 300 may be performed by an event server, such as event server 130 of FIG. 1. In some embodiments, method 300 begins at 305, where the event server sends data to be cached at a vehicle. Such transmissions may be used by the vehicle to make determinations about geo-fence entry without transmissions to the event server.

In other embodiments, method 300 begins at 310, where the event server monitors the location of the vehicle. Monitoring the location of the vehicle may involve consistently tracking the location of the vehicle, such as by use of a location tracking device or GPS system. The vehicle may also periodically (e.g., once every minute) transmit a current location of the vehicle to the event server.

At 320, the event server determines, based on the location of the vehicle and stored geo-fence data, that the vehicle has crossed a geo-fence and entered a new regulation area. The geo-fence data describes latitude and longitude boundaries of regulation areas as well as the regulations associated with the regulation areas. The geo-fence data may be obtained by the event server from regulatory bodies that promulgate the regulations. For example, an airport authority may create a regulation on vehicle activity within the airport, and provide to an administrator or manager of the event server the geo-fence boundaries of the airport and the associated regulations. In other cases, the administrator of the event server may access published documents of the regulatory body to generate the geo-fence data.

At 330, the event server determines if the new regulation area that the vehicle has entered has different regulations compared to the previous or old regulation area that the vehicle was in. Such a determination may involve determining the prevailing weather conditions of the new regulation area, as well as the current time of day. Prevailing weather conditions may be relevant if, for example, a regulation is only in place while air quality is below a certain threshold. If the new regulation zone does not have different regulations compared to the old regulation zone, method 300 ends, or may return to 310 and continue monitoring of the vehicle location. If the new regulation zone does have different regulation compared to the old regulation zone, method 300 proceeds to 340.

At 340, the event server determines instructions based on the regulation of the new regulation area. Such instructions may include prohibiting actions, such as engine braking, idling or shifting to high gears, or may include requested actions, such as exit from the roadway or exit from the new regulation area. Instructions may also include various information to be displayed to the operator of the vehicle, such as warnings or explanations for the instructions.

At 350, the event server transmits the instructions determined at 340 to the vehicle. As discussed above, this transmission may be over a network connection to the vehicle via a server interface of the vehicle. After transmitting the instructions, the event server may receive various response transmissions from the vehicle including transmissions confirming receipt of the instructions or reporting successful implementation of the instructions. If the vehicle determines that implementation of the instructions conflicts with safe operation of the vehicle, the vehicle may transmit a report of instruction override to the event server.

Figure 4:
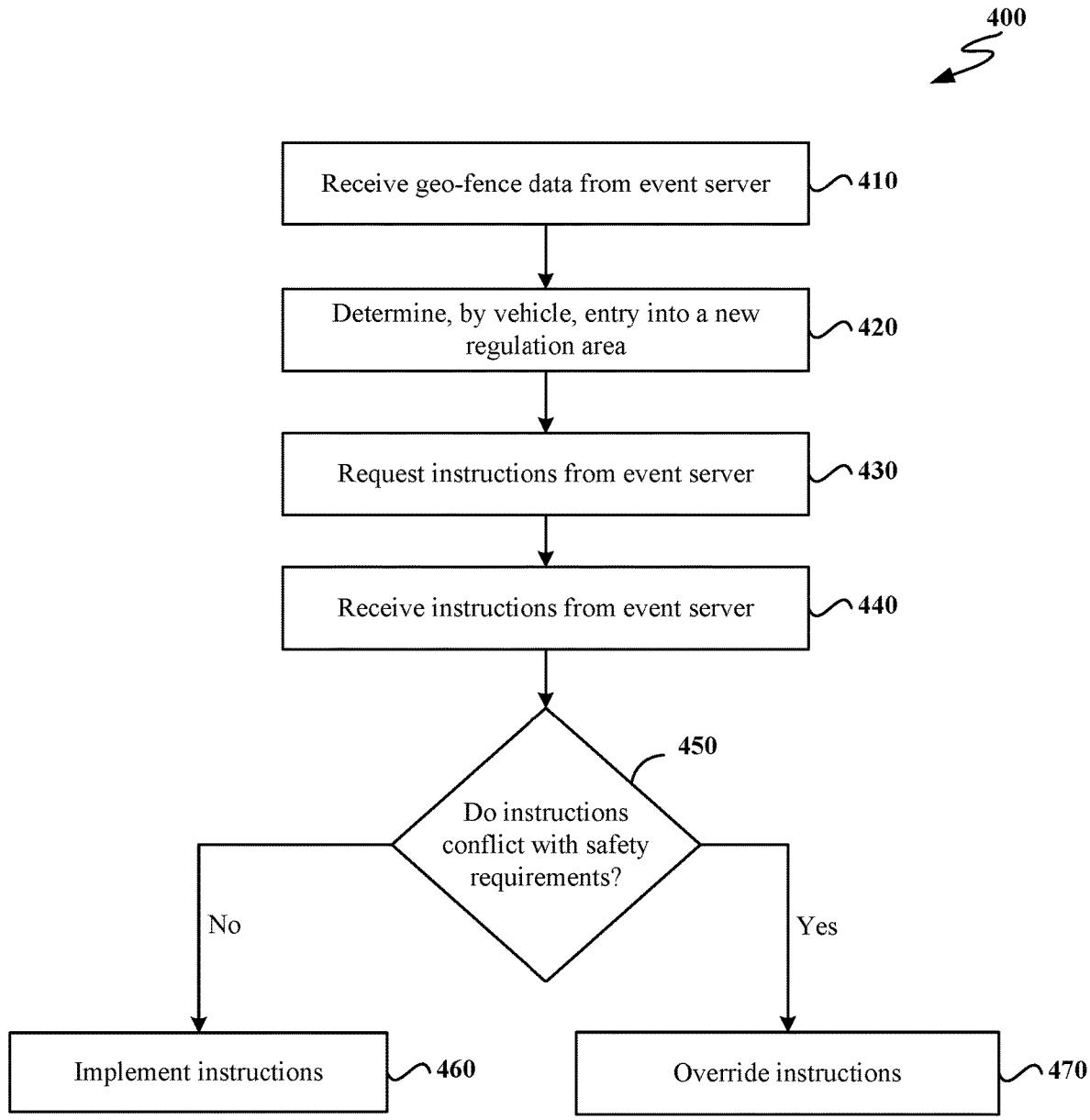
FIG. 4 is a flow diagram showing an example method for implementing instructions by a vehicle.

FIG. 4 is a flow diagram showing an example method 400 for implementing instructions by a vehicle. Method 400 begins at 410, where the vehicle receives geo-fence data from an event server. The geo-fence data may then be locally cached at the vehicle in order to allow the vehicle to make geo-fence entry determinations without additional transmissions to the event server. The geo-fence data may be periodically updated (e.g., weekly or monthly) to ensure that newly created regulation areas, or regulations added to existing areas, are accounted for by the vehicle.

At 420, the vehicle uses the cached geo-fence data to determine entry into a new regulation area. Upon determining this entry, at 430 the vehicle requests instructions from the event server. Use of cached geo-fence data as here described may be useful in preventing constant transmissions from the vehicle to the event server reporting the vehicle location, by limiting transmissions to when the vehicle has entered a regulation area. Additionally, use of cached geo-fence data may be beneficial when a network connection between the vehicle and the event server is intermittently unavailable, or when the latency of the network connection is high.

At 440, the vehicle received instructions from the event server. The event server may have generated the instructions using a method such as method 300 of FIG. 3. After receiving the instructions, at 450 the vehicle determines if the instructions conflict with safety requirements of the vehicle. For example, prohibiting engine braking may be inappropriate when an emergency exit from the roadway is taking place, or requesting exit from the roadway may be inappropriate when a mandatory evacuation order is in effect. If the instructions do conflict with safety requirements of the vehicle, method 400 proceeds to 470, where the instructions are ignored or overridden. In such a case the vehicle may transmit a report of instruction override to the event server.

If the instructions do not conflict with safety requirements of the vehicle, method 400 proceeds to 460, where the vehicle implements the instructions. Implementing the instructions involves determining the exact electrical signals to elicit the proper response from engine components. For example, instructions to use a leaner fuel mixture may differ depending on the make and model of vehicle. In general, the vehicle generates electrical signals to implement the instructions and transmits the signals across a CAN bus to various devices and systems of the vehicle. Instructions may include displaying various data or warning lights to an operator of the vehicle. If the vehicle is autonomous or semi-autonomous, the instructions may be directly implemented by the vehicle rather than requesting compliance by the operator.

Figure 5:
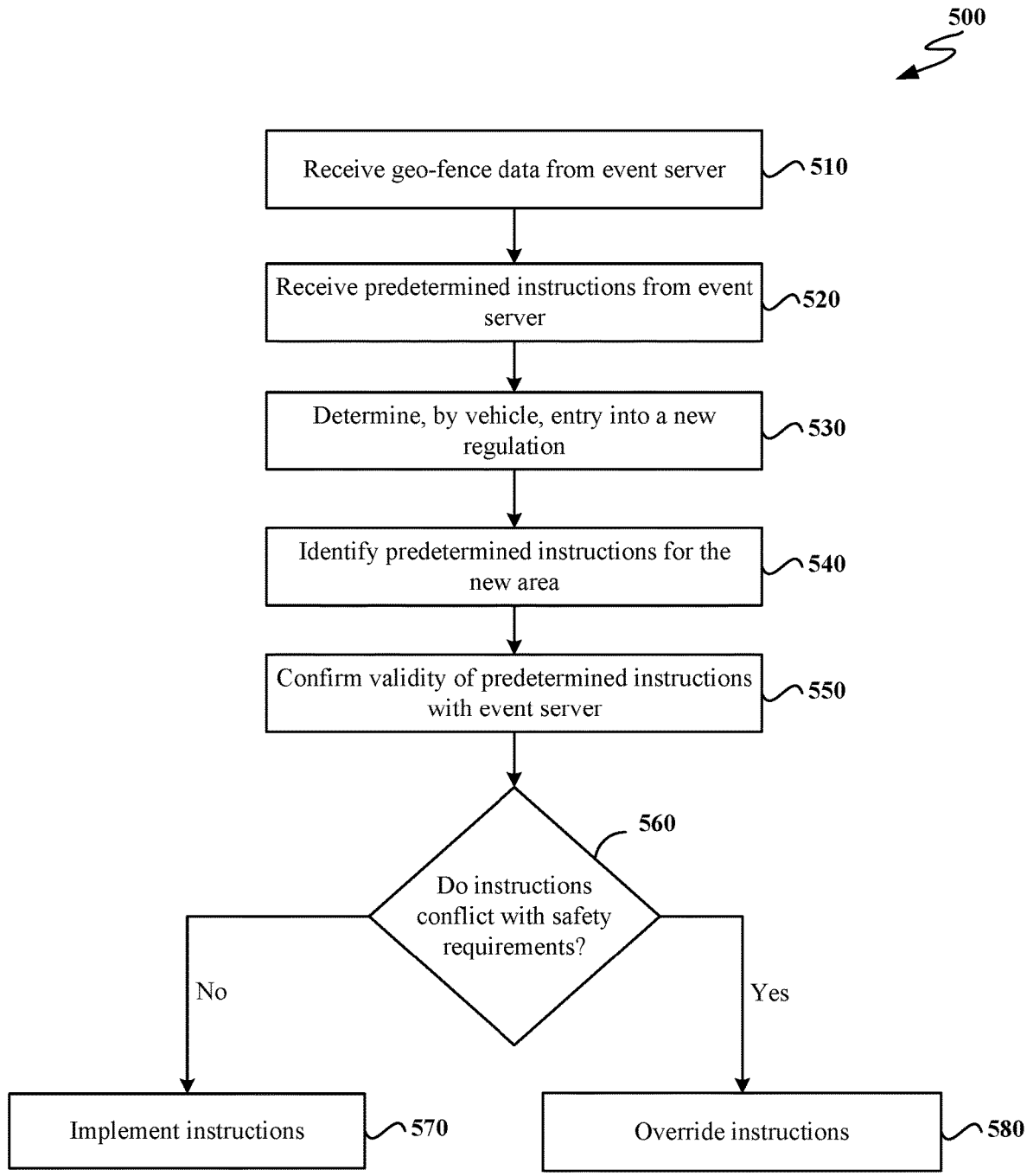
FIG. 5 is a flow diagram showing an example method for implementing cached instructions by a vehicle.

FIG. 5 is a flow diagram showing an example method 500 for implementing cached instructions by a vehicle. Method 500 begins at 510, where the vehicle receives geo-fence data from an event server and caches the geo-fence data. Then, at 520, the vehicle receives predetermined instructions from the event server. The predetermined instructions may also be cached by the vehicle. The predetermined instructions are instructions for compliance with nearby regulation areas that may be temporarily implemented by the vehicle while the vehicle attempts confirmation with the event server. The predetermined instructions may be periodically updated (e.g., hourly) to account for current time of day or current weather conditions of nearby regulation areas.

At 530, the vehicle determines that the vehicle has crossed a geo-fence and entered a new regulation area. At 540, the vehicle identifies predetermined instructions associated with the new regulation area. In this example, method 500 proceeds to 550, where the vehicle determines the validity of the predetermined instructions with the event server. Confirmation of validity typically involves a transmission to the event server requesting confirmation of the predetermined instructions. The event server may then either transmit a confirmation to the vehicle, or may transmit current instructions to the vehicle. In some embodiments of method 500, the vehicle may implement the predetermined instructions before confirming the validity of the predetermined instructions, or may implement the predetermined instructions and confirm the validity thereof in parallel.

In this example, after confirming validity of the predetermined instructions, method 500 proceeds to 560, where the vehicle determines if the predetermined instructions conflict with safety requirements of the vehicle. If the predetermined instructions do not conflict with safety requirements of the vehicle, method 500 proceeds to 570, where the vehicle implements the instructions. If the predetermined instructions do conflict with safety requirements of the vehicle, method 500 proceeds to 580, where the vehicle overrides the predetermined instructions.

Some embodiments of the present disclosure provide a method comprising: monitoring location information of a vehicle; detecting a location change of the vehicle based on the monitoring, wherein the location change is between a first regulation area and a second regulation area; generating instructions for the vehicle based on the location change, wherein the instructions place the vehicle in compliance with a regulation of the second regulation area; and transmitting the instructions to the vehicle.

In some embodiments of this method, detecting the location change of the vehicle comprises: determining a geo-fence of the first regulation area; determining a geo-fence of the second regulation area; and detecting when the vehicle crosses the geo-fence of the first regulation area into the geo-fence of the second regulation area.

In some embodiments of this method the instructions adjusts an operation of the vehicle.

In some embodiments of this method the regulation of the second regulation area is an emissions requirement In some embodiments of this method the instructions request adjusting an engine setting in response to a determination that the vehicle remains idle for an amount of time exceeding a first threshold.

In some embodiments of this method the adjusting an engine setting disables the engine.

Some embodiments of this method further include detecting a second change in vehicle location, wherein the second change in vehicle location is between the second regulation area and a third regulation area.

Some embodiments of this method further include generating an updated instruction wherein the updated instruction requests ceasing the previous instructions; and transmitting the updated instruction to the vehicle.

Other embodiments of the present disclosure provide a method comprising determining, by a vehicle using cached geo-fence data, the vehicle has entered into a second regulation area from a first regulation area; requesting, from an event server, instructions for the second regulation area; receiving the instructions from the event server; determining if the instructions conflict with safety requirements of the vehicle; and if the instructions do not conflict with safety requirements of the vehicle, implementing the instructions.

Some embodiments of this method further include receiving predetermined instructions from the event server; and caching the predetermined instructions at the vehicle.

Some embodiments of this method further include confirming validity of the predetermined instructions with the event server; and implementing the predetermined instructions.

Some embodiments of this method further include if the instructions do conflict with safety requirements of the vehicle, overriding the instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a geo-fence data or related data available in the cloud. For example, the components of an event server as described herein could execute on a computing system in the cloud and provide vehicle instructions to vehicles. In such a case, the functions of the event server could be provide by the cloud computing system and store geo-fence data and/or instructions at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a memory including computer readable instructions, which, when executed by the processor, cause the system to perform a method comprising:
   monitoring location information of a vehicle;
   detecting a location change of the vehicle based on the monitoring, wherein the location change is between a first regulation area and a second regulation area;
   generating instructions for the vehicle based on the location change, wherein the instructions place the vehicle in compliance with a regulation of the second regulation area; and
   transmitting the instructions to the vehicle, wherein the instructions are configured to adjust an operation of the vehicle.

2. The system of claim 1, wherein detecting the location change of the vehicle comprises:
   determining a geo-fence of the first regulation area;
   determining a geo-fence of the second regulation area; and
   detecting when the vehicle crosses the geo-fence of the first regulation area into the geo-fence of the second regulation area.

3. The system of claim 1, wherein the regulation of the second regulation area is an emissions requirement.

4. The system of claim 1, wherein the instructions request adjusting an engine setting in response to a determination that the vehicle remains idle for an amount of time exceeding a first threshold.

5. The system of claim 4, wherein the adjusting an engine setting disables the engine.

6. The system of claim 4, wherein the method further comprises:
   detecting a second change in vehicle location, wherein the second change in vehicle location is between the second regulation area and a third regulation area.

7. The system of claim 6, wherein the method further comprises:
   generating an updated instruction wherein the updated instruction requests ceasing the instructions; and
   transmitting the updated instruction to the vehicle.

8. A method comprising:
   monitoring location information of a vehicle;
   detecting a location change of the vehicle based on the monitoring, wherein the location change is between a first regulation area and a second regulation area;
   generating instructions for the vehicle based on the location change, wherein the instructions place the vehicle in compliance with a regulation of the second regulation area; and
   transmitting the instructions to the vehicle, wherein the instructions are configured to adjust an operation of the vehicle.

9. The method of claim 8, wherein detecting the location change of the vehicle comprises:
   determining a geo-fence of the first regulation area;
   determining a geo-fence of the second regulation area; and
   detecting when the vehicle crosses the geo-fence of the first regulation area into the geo-fence of the second regulation area.

10. The method of claim 1, wherein the regulation of the second regulation area is an emissions requirement.

11. The method of claim 1, wherein the instructions request adjusting an engine setting in response to a determination that the vehicle remains idle for an amount of time exceeding a first threshold.

12. The method of claim 11, wherein the adjusting an engine setting disables the engine.

13. The method of claim 11 further comprising:
    detecting a second change in vehicle location, wherein the second change in vehicle location is between the second regulation area and a third regulation area.

14. The method of claim 13 further comprising:
    generating an updated instruction wherein the updated instruction requests ceasing the instructions; and
    transmitting the updated instruction to the vehicle.

15. A method comprising:
    determining, by a vehicle using cached geo-fence data, the vehicle has entered into a second regulation area from a first regulation area;
    requesting, from an event server, instructions for the second regulation area wherein the instructions place the vehicle in compliance with a regulation of the second regulation area;
    receiving the instructions from the event server;
    determining whether the instructions conflict with safety requirements of the vehicle; and
    upon determining the instructions do not conflict with safety requirements of the vehicle, implementing the instructions.

16. The method of claim 15, further comprising:
    receiving predetermined instructions from the event server; and
    caching the predetermined instructions at the vehicle.

17. The method of claim 16, further comprising:
    confirming validity of the predetermined instructions with the event server; and
    implementing the predetermined instructions.

18. The method of claim 15, further comprising, if the instructions do conflict with safety requirements of the vehicle, overriding the instructions.

* * * * *